(12) United States Patent
Chou et al.

(10) Patent No.: US 9,049,008 B2
(45) Date of Patent: Jun. 2, 2015

(54) DISTRIBUTED KEY-BASED ENCRYPTION SYSTEM

(75) Inventors: Pai-Hsiang Chou, Taipei (TW);
An-Ping Wang, Hsinchu (TW); Shin-Yi Chang, Chiayi County (TW);
Cheng-Dao Lee, Taoyuan County (TW);
Chi-Yuan Lee, Kaohsiung (TW)

(73) Assignee: NATIONAL TSING HUA UNIVERSITY, Hsinchu (TW)

(*) Notice: Subject to any disclaimer, the term of this patent is extended or adjusted under 35 U.S.C. 154(b) by 205 days.

(21) Appl. No.: 13/532,510

(22) Filed: Jun. 25, 2012

(65) Prior Publication Data

US 2013/0294604 A1   Nov. 7, 2013

(30) Foreign Application Priority Data

May 4, 2012  (TW) ............................. 101115934 A

(51) Int. Cl.
*H04L 9/08* (2006.01)
*H04W 12/04* (2009.01)
*H04L 29/06* (2006.01)
*H04W 12/02* (2009.01)

(52) U.S. Cl.
CPC ................ *H04L 9/0827* (2013.01); *H04L 9/08* (2013.01); *H04W 12/04* (2013.01); *H04L 63/18* (2013.01); *H04W 12/02* (2013.01); *H04L 2209/80* (2013.01)

(58) Field of Classification Search
CPC . H04L 9/08; H04L 29/06666; H04L 63/0435; H04L 9/0827; G06F 2221/2125
USPC .......................................................... 380/278
See application file for complete search history.

(56) References Cited

U.S. PATENT DOCUMENTS

| 5,623,546 | A | | 4/1997 | Hardy |
|---|---|---|---|---|
| 6,105,006 | A | * | 8/2000 | Davis et al. ..................... 705/35 |
| 2002/0095382 | A1 | * | 7/2002 | Taoka et al. ..................... 705/50 |
| 2004/0125077 | A1 | * | 7/2004 | Ashton ........................ 345/156 |
| 2005/0159905 | A1 | * | 7/2005 | Bond et al. ..................... 702/51 |
| 2005/0275527 | A1 | * | 12/2005 | Kates ........................ 340/539.22 |
| 2006/0085348 | A1 | * | 4/2006 | Alda et al. ..................... 705/52 |
| 2007/0113076 | A1 | * | 5/2007 | Cowburn et al. .............. 713/159 |
| 2009/0103726 | A1 | * | 4/2009 | Ahmed .......................... 380/46 |
| 2010/0002884 | A1 | * | 1/2010 | Sherman ..................... 380/278 |
| 2010/0034388 | A1 | * | 2/2010 | Nakano et al. .............. 380/277 |
| 2010/0211217 | A1 | * | 8/2010 | Hirsh et al. .................. 700/234 |
| 2010/0223458 | A1 | * | 9/2010 | McGrew et al. .............. 713/153 |
| 2011/0165861 | A1 | * | 7/2011 | Wilson et al. ................. 455/411 |
| 2013/0027351 | A1 | * | 1/2013 | Los .............................. 345/175 |
| 2013/0110462 | A1 | * | 5/2013 | Lovitt .......................... 702/179 |
| 2013/0138961 | A1 | * | 5/2013 | Tsuji et al. ................... 713/171 |
| 2013/0165231 | A1 | * | 6/2013 | Nelson et al. ................. 463/42 |
| 2013/0198528 | A1 | * | 8/2013 | Walrath ....................... 713/189 |
| 2013/0305033 | A1 | * | 11/2013 | Lacson et al. ................ 713/150 |
| 2014/0072119 | A1 | * | 3/2014 | Hranilovic et al. .......... 380/270 |

* cited by examiner

*Primary Examiner* — O. C. Vostal
(74) *Attorney, Agent, or Firm* — Muncy, Geissler, Olds & Lowe, P.C.

(57) ABSTRACT

A distributed key-based encryption system comprises a sending side and a receiving side. The sending side comprises a key-data generation unit, an encryption unit, a first wireless-transfer unit, and a second wireless-transfer unit. The receiving side comprises a third wireless-transfer unit, a fourth wireless-transfer unit, and a decryption unit. The communication between the second wireless-transfer unit and the fourth wireless-transfer unit is directional.

9 Claims, 3 Drawing Sheets

DISTRIBUTED KEY-BASED ENCRYPTION SYSTEM

This application claims priority of No. 101115934 filed in Taiwan R.O.C. on May 4, 2012 under 35 USC 119, the entire content of which is hereby incorporated by reference.

BACKGROUND OF THE INVENTION

1. Field of the Invention

The invention relates to a distributed key-based encryption system and a distributed key-based encryption method, and more particularly to a directional encryption system and a directional encryption method of performing the transfer using a plurality of transfer interfaces.

2. Related Art

A conventional wired network needs to ensure the security of the peer-to-peer data transfer through a physical cable. In the wireless sensor network (WSN) architecture, however, the encrypted data in the key-based encryption system is usually transferred through a single wireless-transfer interface, such as radio-frequency signal. Therefore, its encrypted data and key data are transferred through the same transfer interface.

In the WSN environment, the wireless signal is transferred in the air and is unidirectional, so this transfer method tends to be tapped or skimmed by the interested parties and the data is easily stolen by the eavesdropper.

SUMMARY OF THE INVENTION

An object of the invention is to provide a distributed key-based encryption system and a distributed key-based encryption method capable of enhancing the security in data transfer.

Another object of the invention is to provide a distributed key-based encryption system and a distributed key-based encryption method capable of diversifying the risk of data being stolen.

Still another object of the invention is to provide a distributed key-based encryption system and a distributed key-based encryption method capable of distributing the data and transferring the data through a plurality of transfer interfaces.

An embodiment of the invention provides a distributed key-based encryption system comprising a sending side and a receiving side. The sending side comprises a key-data generation unit, an encryption unit, a first wireless-transfer unit, and a second wireless-transfer unit. The receiving side comprises a third wireless-transfer unit, a fourth wireless-transfer unit, and a decryption unit. The key-data generation unit generates at least one key data. The encryption unit generates an encryption data according to a data and the key data. The first wireless-transfer unit is coupled to the encryption unit and transfers one of the encryption data and the key data. The second wireless-transfer unit is coupled to the encryption unit and transfers the other one of the encryption data and the key data. The third wireless-transfer unit receives one of the encryption data and the key data transferred by the first wireless-transfer unit. The fourth wireless-transfer unit receives the other one of the encryption data and the key data transferred by the second wireless-transfer unit. The decryption unit is coupled to the third wireless-transfer unit and the fourth wireless-transfer unit, and decrypts and reproduces the encryption data into the original data according to the encryption data and the key data. A data length of the key data corresponds to a data length of the original data.

An embodiment of the invention provides a distributed key-based encryption method comprising the steps of: generating at least one key data using at least two wireless-transfer units; generating an encryption data according to a data and a key data; transferring one of the encryption data and the key data through a first wireless-transfer unit; transferring the other one of the encryption data and the key data through a second wireless-transfer unit; receiving one of the encryption data and the key data through a third wireless-transfer unit; receiving the other one of the encryption data and the key data through a fourth wireless-transfer unit; decrypting and reproducing the encryption data into the original data according to the encryption data and the key data. A data length of the key data corresponds to a data length of the data.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and the scope of the present invention will become apparent to those skilled in the art from this detailed description.

BRIEF DESCRIPTION OF THE DRAWINGS

The present invention will become more fully understood from the detailed description given herein below and the accompanying drawings that are given by way of illustration only, and thus are not limitative of the present invention.

FIG. 2 is a schematic illustration showing data division method of the encryption system according to an embodiment of the invention.

DETAILED DESCRIPTION OF THE INVENTION

The present invention will be apparent from the following detailed description, which proceeds with reference to the accompanying drawings.

Figure 1:
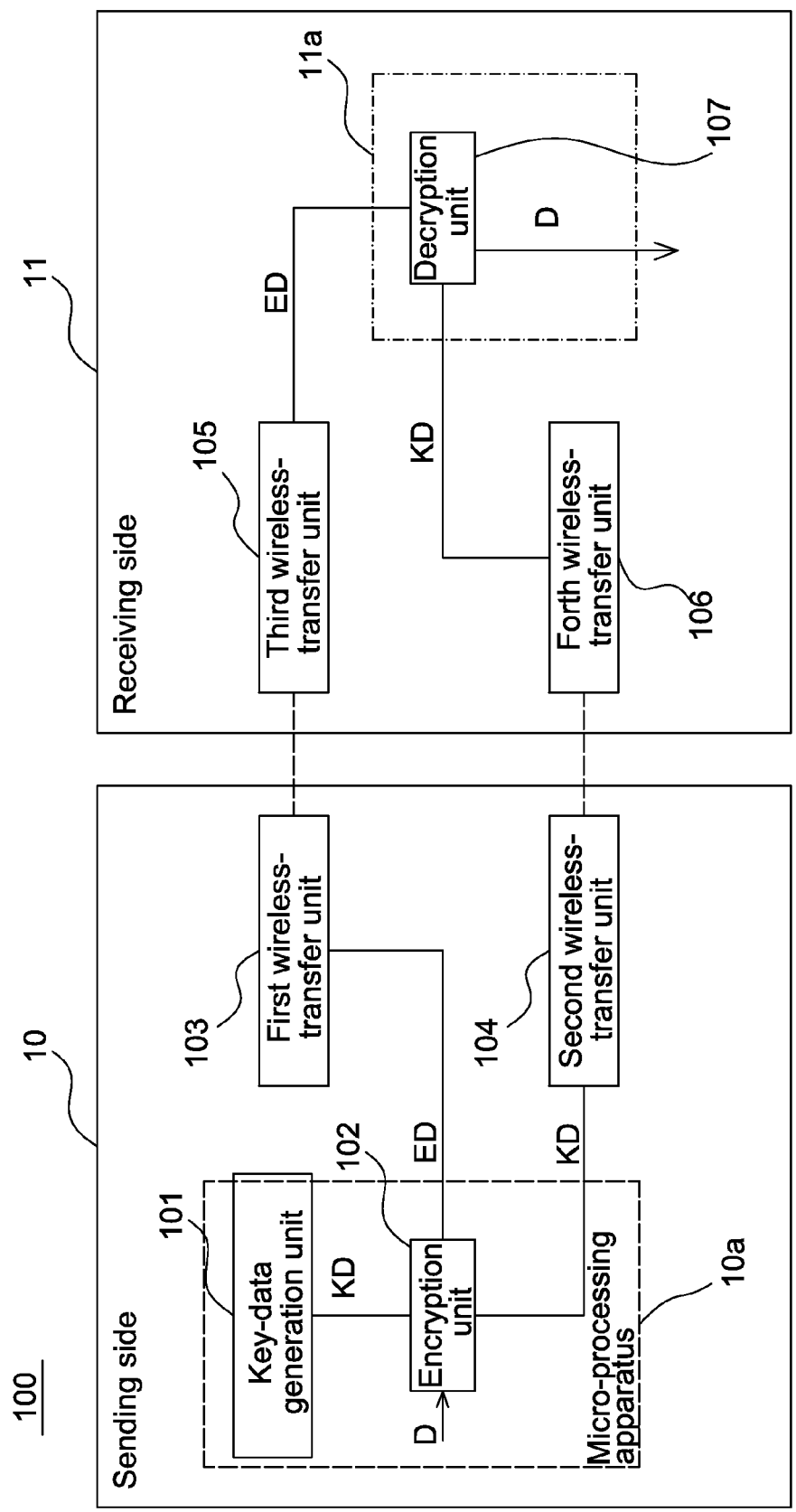
FIG. 1 is a schematic illustration showing an encryption system according to an embodiment of the invention.

FIG. 1 is a schematic illustration showing an encryption system 100 according to an embodiment of the invention. Referring to FIG. 1, the encryption system 100 performs the transfer using the distributed key data and comprises a sending side 10 and a receiving side 11.

The sending side 10 comprises a key-data generation unit 101, an encryption unit 102, a first wireless-transfer unit 103 and a second wireless-transfer unit 104.

The key-data generation unit 101 generates a key data KD and transfers the key data KD to the encryption unit 102. The encryption unit 102 receives the key data KD and a data D that the user wants to transfer. The encryption unit 102 generates an encryption data ED according to the data D and the key data KD. The key data KD is randomly generated by the key-data generation unit 101.

Please note that, in one embodiment of the invention, when the encryption system 100 has N wireless-transfer units and N is a positive integer, the key-data generation unit 101 generates N−1 key data KD_1 to KD_N−1. For the sake of conciseness, there are two wireless-transfer units (the first wireless-transfer unit 103 and the second wireless-transfer unit 104) in this embodiment, so a key data KD is generated. However, the invention is not particularly restricted thereto.

Figure 2:
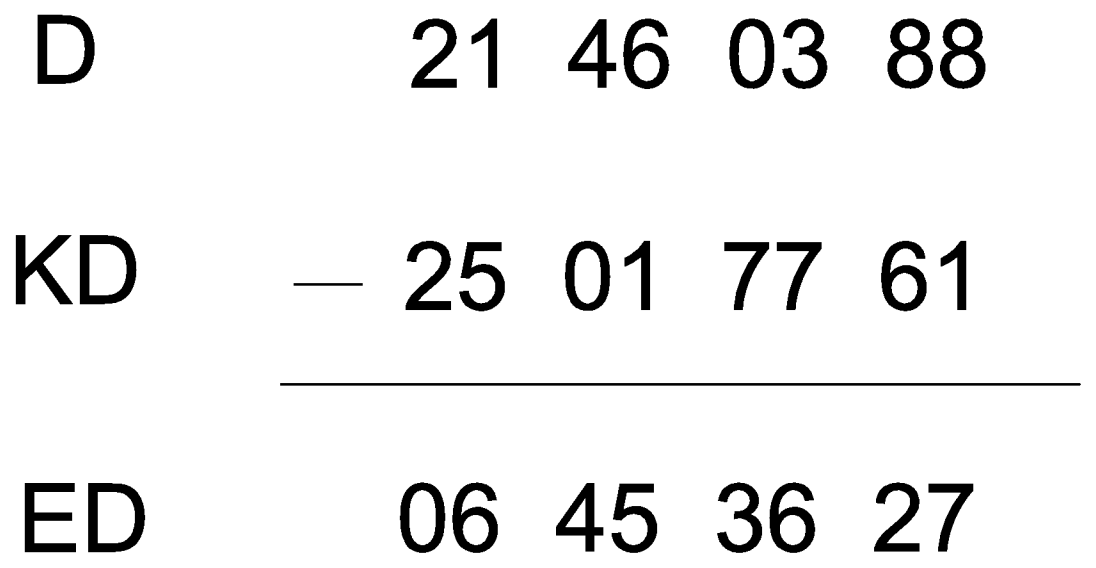

FIG. 2 is a schematic illustration showing data division of the encryption system according to an embodiment of the invention. Referring to the example of FIG. 2, the data D to be transferred by the encryption system 100 has the decimal format (e.g., 21 46 03 88). At this time, the key-data generation unit 101 generates the key data KD (e.g., 25 01 77 61) corresponding to the data D. In this embodiment, the data length of the key data KD corresponds to the data length of the data D.

The encryption unit 102 utilizes the addition or subtraction operation without carry to generate the encryption data ED according to the data D and the key data KD. In this embodiment, the encryption system 100 adopts the subtraction operation without carry. In other words, the subtraction operation without carry is performed with respect to each digit of the data D and each digit of the key data KD (e.g., 21−25=04, 03−77=36), so the encryption data ED can be generated as 06 45 36 27.

Next, the first wireless-transfer unit 103 transfers one of the encryption data ED and the key data KD, and the second wireless-transfer unit 104 transfers the other one of the encryption data ED and the key data KD. In this embodiment, the first wireless-transfer unit 103 transfers the encryption data ED, and the second wireless-transfer unit 104 transfers the key data KD. However, the invention should not be particularly restricted thereto.

In addition, the key-data generation unit 101 and the encryption unit 102 are disposed in a micro-processing apparatus 10a in one embodiment, and the key-data generation unit 101 and the encryption unit 102 may be implemented by firmware or hardware.

The receiving side 11 comprises a third wireless-transfer unit 105, a fourth wireless-transfer unit 106, and a decryption unit 107. The third wireless-transfer unit 105 receives the encryption data ED or the key data KD transferred by the first wireless-transfer unit 103. In this embodiment, the first wireless-transfer unit 103 transfers the encryption data ED, so the third wireless-transfer unit 105 receives the encryption data ED. Correspondingly, the fourth wireless-transfer unit 106 receives the key data KD transferred by the second wireless-transfer unit 104.

In one embodiment, the decryption unit 107 is disposed in a micro-processing apparatus 11a, and the decryption unit 107 may be implemented by the firmware or hardware.

Please note that the second wireless-transfer unit 104 and the fourth wireless-transfer unit 106 perform the transfer through the optical signals. In one embodiment, the second wireless-transfer unit 104 may be implemented by any existing or future apparatus, such as a light-emitting diode (LED), a laser diode (LD), or a programmable reflector, which is capable of generating or reflecting light. The fourth wireless-transfer unit 106 may be implemented by a light-sensing unit. Consequently, the communication between the second wireless-transfer unit 104 and the fourth wireless-transfer unit 106 is directional, thereby ensuring that the data cannot be easily stolen in the midway.

Please note that, in one embodiment, when the second wireless-transfer unit 104 and the fourth wireless-transfer unit 106 perform the transfer through the optical signals, the second wireless-transfer unit 104 may use different wavelengths or colors of light to perform the alternate transfer. In other words, the second wireless-transfer unit 104 may generate a plurality of different wavelengths or colors of light, so that the encryption system 100 can enhance the security in the data transfer process.

In addition, the first wireless-transfer unit 103 and the third wireless-transfer unit 105 perform the transfer through the radio-frequency signal.

The decryption unit 107 is coupled with the third wireless-transfer unit 105 and the fourth wireless-transfer unit 106, and decrypts and reproduces the encryption data ED into the data D according to the encryption data ED and the key data KD. Because the sending side 10 of this embodiment adopts the subtraction operation without carry to perform the encryption, the decryption unit 107 adopts the addition operation without carry to perform the decryption and thus the data D is reproduced. However, the receiving side 11 needs to completely receive the encryption data ED and the key data KD coming from two different transfer pipelines, so that the original data D can be reproduced.

In this embodiment, the second wireless-transfer unit 104 and the fourth wireless-transfer unit 106 perform the transfer through the optical signals, and the second wireless-transfer unit 104 and the fourth wireless-transfer unit 106 transfer the key data KD through the optical signals. So, the sending side 10 can perform the modulation by way of differential pulse position modulation (DPPM), so that the key data KD is converted into a binary waveform to be transferred. Correspondingly, the receiving side 11 demodulates the key data KD by way of the DPPM.

Please also refer to the following functions, which are control functions of the encryption system 100 in one embodiment of the invention.

```
/* Two transfer methods (e.g., radio frequency signal and optical signal)
are set.            */
#define transmit_way 2
/* Radio-frequency signal-transfer function is initialized.    */
RF_init( );
/* Optical signal-transfer function is initialized.    */
IR_init( );
/* Key-data generation unit 101 is initialized, and a key data KD is
generated.          */
RNG_Enable( )
/* The corresponding number of key data KD is generated according to
the number of transfer units of the sending side 10 minus 1.    */
RNG_Encryption_Key1 = RNG_DATA;
/* The original data is encrypted using the subtraction operation without
carry. */
RNG_Encryption_Key2=
Secret_splitting(RNG_Encryption_Key1,Origina_data)
/* The calculated results are transmitted to the receiving side 11 through
the radio-frequency signal and the optical signal, respectively. */
RF_send(RNG_Encryption_Key1);
IR_send(RNG_Encryption_Key2);
```

Figure 3:
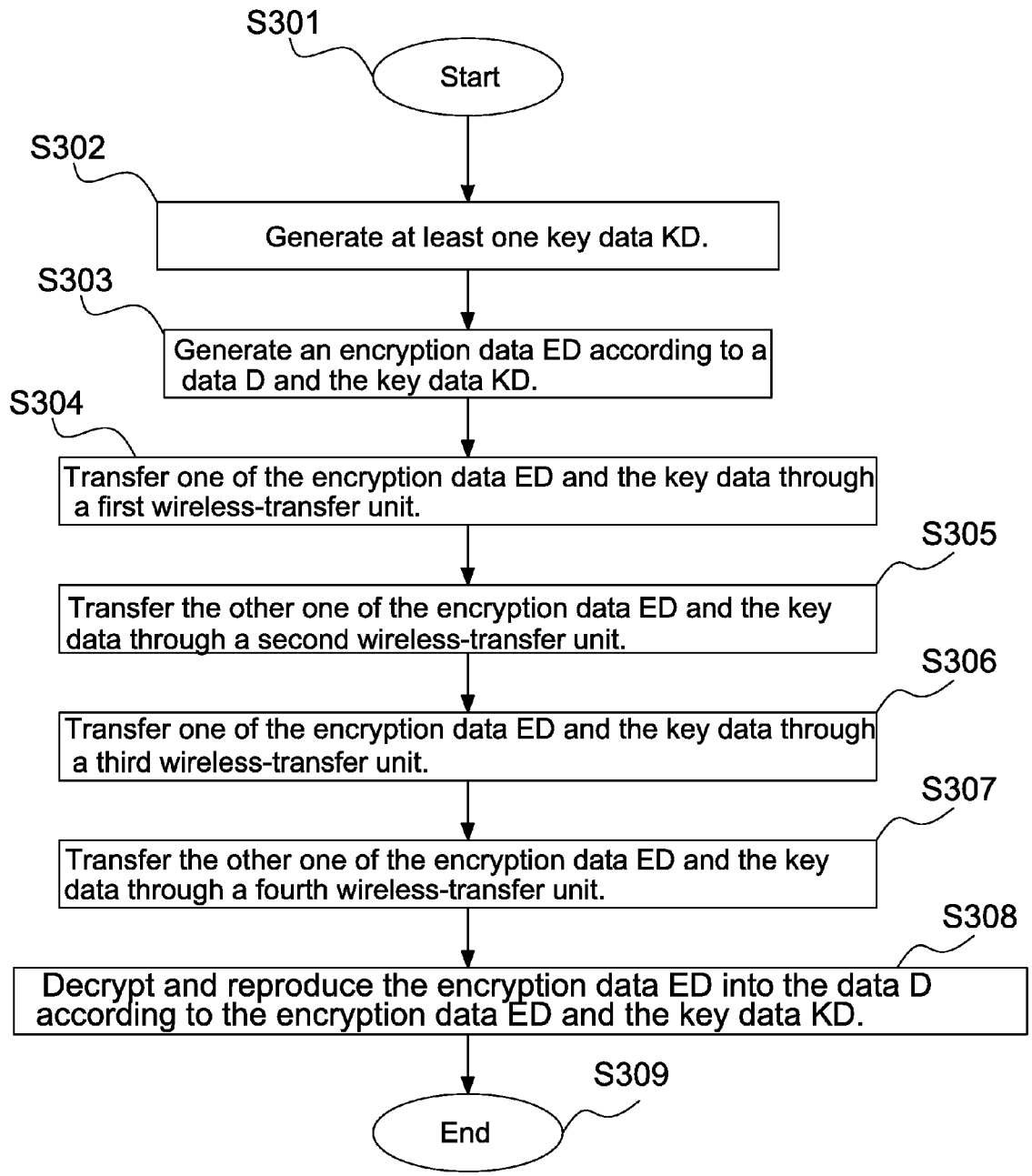
FIG. 3 is a flow chart showing an operation method of the encryption system according to an embodiment of the invention.

FIG. 3 is a flowchart showing an operation method of the encryption system according to an embodiment of the invention. Referring to FIG. 3, the operation method thereof comprises the following steps.

In step S301, the method starts.

In step S302, at least one key data KD is generated.

In step S303, an encryption data ED is generated according to a data D and the key data KD.

In step S304, one of the encryption data ED and the key data KD is transferred through a first wireless-transfer unit.

In step S305, the other one of the encryption data ED and the key data KD is transferred through a second wireless-transfer unit.

In step S306, one of the encryption data ED and the key data KD is received through a third wireless-transfer unit.

In step S307, the other one of the encryption data ED and the key data KD is received through a fourth wireless-transfer unit.

In step S308, the encryption data ED is decrypted and reproduced into the data D according to the encryption data ED and the key data KD.

In step S309, the method ends.

In summary, the system of the invention determines the number of the key data according to the number of the wireless-transfer units on the sending side, encrypts the original data according to the key data, and then transfers the encrypted data. In addition, the sending side transfers the key data and the encryption data to the receiving side through more than two wireless-transfer techniques, respectively. So, the receiving side cannot reproduce the original data until completely receiving the encryption data and the key data coming from more than two transfer pipelines. The transfer through the distributed key data can effectively enhance the data transfer security in the WSN environment.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A distributed key-based encryption system adapted for wireless sensor network; the distributed key-based encryption system comprising a sending side and a receiving side, wherein:

the sending side comprises:
  a key-data generation unit generating at least one key data;
  an encryption unit generating an encryption data according to a data and the key data;
  a first wireless-transfer unit, which is coupled to the encryption unit and transfers one of the encryption data and the key data; and
  a second wireless-transfer unit, which is coupled to the encryption unit and transfers the other one of the encryption data and the key data; and the receiving side comprises:
  a third wireless-transfer unit receiving one of the encryption data and the key data transferred by the first wireless-transfer unit;
  a fourth wireless-transfer unit receiving the other one of the encryption data and the key data transferred by the first wireless-transfer unit; and
  a decryption unit, which is coupled to the third wireless-transfer unit and the fourth wireless-transfer unit, and decrypts and reproduces the encryption data into the data according to the encryption data and the key data,
wherein a data length of the key data corresponds to a data length of the data; communication between the second wireless-transfer unit and the fourth wireless-transfer unit is directional.

2. The system according to claim 1, wherein when the number of the wireless-transfer units of the sending side is equal to N, the key-data generation unit generates N−1 key data, wherein N is a positive integer greater than 2.

3. The system according to claim 2, wherein the encryption unit generates the encryption data according to the data and the key data utilizing an addition or subtraction operation without carry.

4. The system according to claim 2, wherein the first wireless-transfer unit communicates with the third wireless-transfer unit through radio-frequency signals; and the second wireless-transfer unit communicates with the fourth wireless-transfer unit through optical signals.

5. The system according to claim 4, wherein the decryption unit reproduces the data according to the key data and the encryption data utilizing an addition or subtraction operation without carry.

6. A distributed key-based encrypt method adapted for wireless sensor network comprising:
  generating at least one key data executed by a key-data generation unit;
  generating an encryption data according to a data and the key data executed by an encryption unit;
  transferring one of the encryption data and the key data through a first wireless-transfer unit;
  transferring the other one of the encryption data and the key data through a second wireless-transfer unit;
  receiving one of the encryption data and the key data through a third wireless-transfer unit;
  receiving the other one of the encryption data and the key data through a fourth wireless-transfer unit;
  decrypting and reproducing the encryption data into the data according to the encryption data and the key data executed by a decryption unit,
wherein a data length of the key data corresponds to a data length of the data; communication between the second wireless-transfer unit and the fourth wireless-transfer unit is directional.

7. The method according to claim 6, wherein N−1 key data are generated when the number of the wireless-transfer units of a sending side is equal to N, wherein N is a positive integer greater than 2.

8. The method according to claim 7, wherein the encryption data is a result obtained according to the data and the key data utilizing an addition or subtraction operation without carry.

9. The method according to claim 8, wherein communication between the second wireless-transfer unit and the fourth wireless-transfer unit is through optical signals.

* * * * *